April 5, 1955

J. H. DUCKWORTH ET AL 2,705,446

TRACTOR MOUNTED PLOW

Filed Oct. 18, 1949

INVENTORS
JESSIE HOMER DUCKWORTH
MARION ANDREW GOSWICK
BY
Church & Church
ATTORNEYS

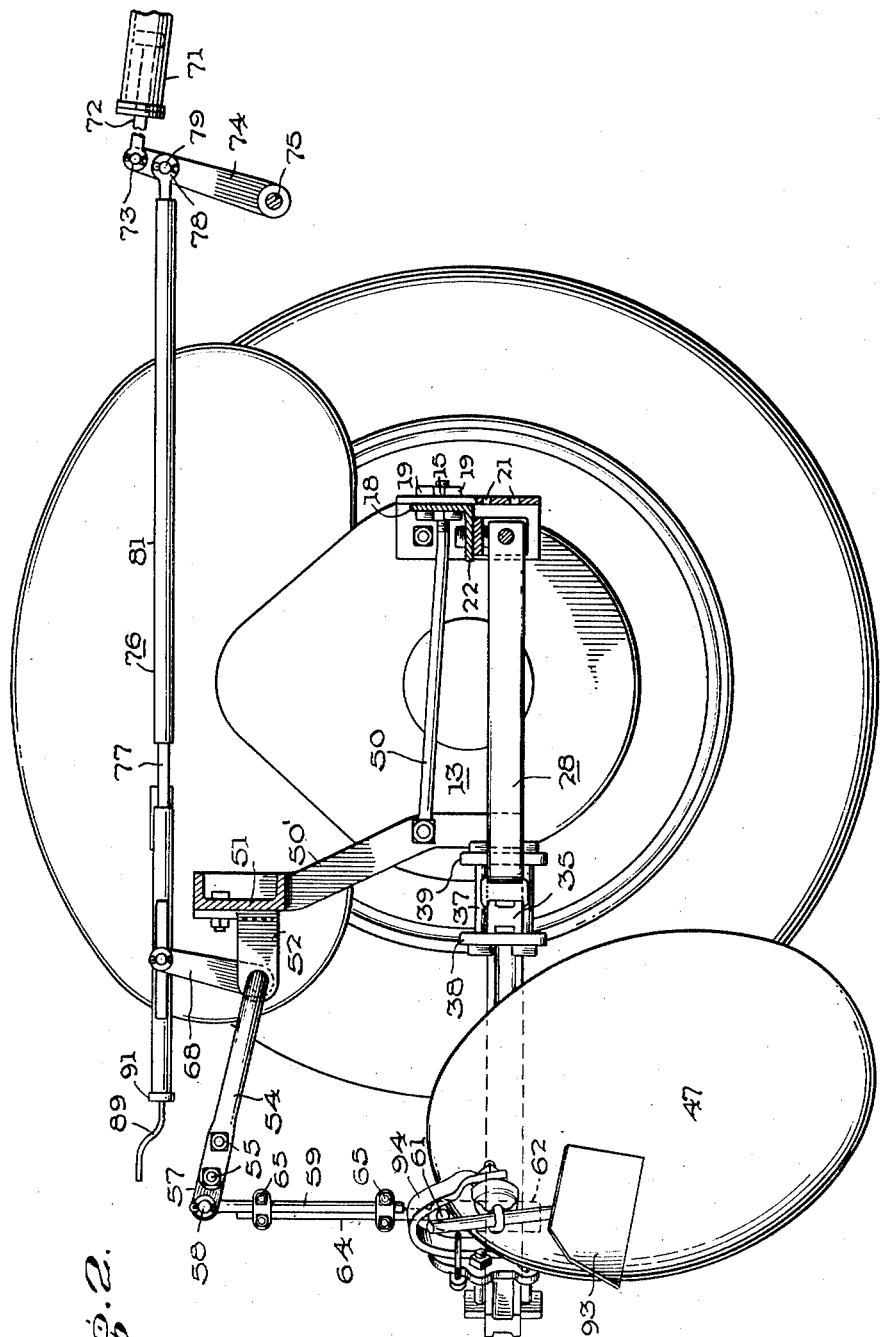

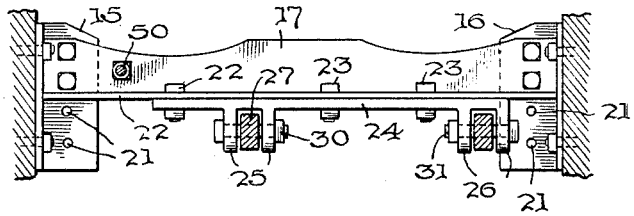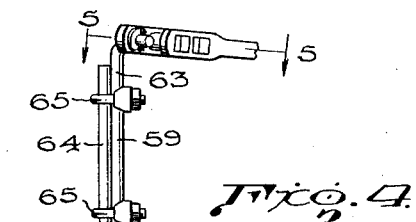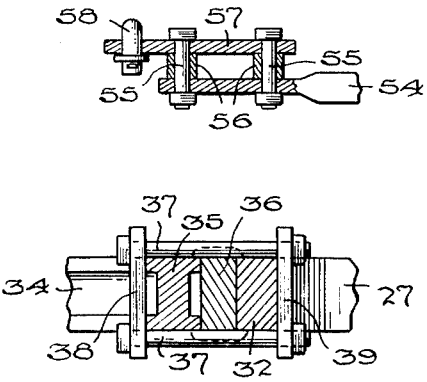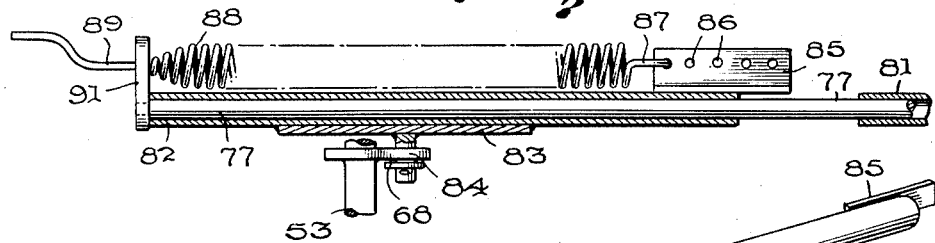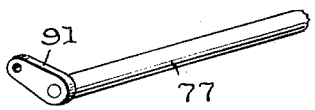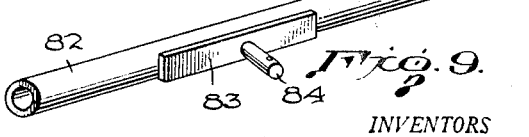

United States Patent Office 2,705,446
Patented Apr. 5, 1955

2,705,446

TRACTOR MOUNTED PLOW

Jessie Homer Duckworth and Marion Andrew Goswick, Chatsworth, Ga.

Application October 18, 1949, Serial No. 122,004

1 Claim. (Cl. 97—47.62)

This invention concerns disk plow apparatus for attachment between the rear wheels of a tractor.

A principal object of the invention is to provide a disk plow which is supported entirely on the tractor and does not require any ground engaging device other than the plow disk itself.

A major object of the invention is to provide a disk plow attached between the rear wheels of a tractor which will plow rugged soil without swaying or swinging. Another, and related object, is to provide a disk plow which will plow on a hillside and throw the plowed dirt up hill, leaving the furrow level.

A still further object of the invention is to provide a disk plow assembly which is wholly carried by the tractor so the plow may be raised and lowered to move it from one field to another. A specific object is to provide a disk plow supported solely by the tractor and yieldingly urged into the ground.

In accordance with these objects one important feature of the invention resides in the arrangement of a plow supporting beam on a U-shaped drawbar with the beam extending rearwardly of the drawbar. Another feature resides in the pivotal connection of the drawbar by a drawbar hitch mounted on a pulling crossbar between the rear wheels and forward of their axles. With the drawbar connection and lateral support of the beam, a plow disk on the beam is raised or yieldingly urged downward by a rigid link connected to a lever which may be turned to raise or lower the plow.

Other objects and advantages will become apparent from the following specification taken in connection with the accompanying drawings wherein:

Fig. 2 is a vertical sectional view taken on the line 2—2 of Fig. 1;

Fig. 3 is a partial sectional view taken on the line 3—3 of Fig. 1;

Fig. 4 is a partial cross-sectional view taken on the line 4—4 of Fig. 1;

Fig. 5 is a fragmentary sectional view taken on the line 5—5 of Fig. 4;

Fig. 6 is an enlarged fragmentary sectional view taken on the line 6—6 of Fig. 1;

Fig. 7 is an enlarged fragmentary view showing the extensible rod with its spring connection for raising and lowering the plow disk;

Fig. 8 is a perspective view of a portion of the rod shown in Fig. 7; and

Fig. 9 is a perspective view of the sleeve shown in Fig. 7.

Figure 1:
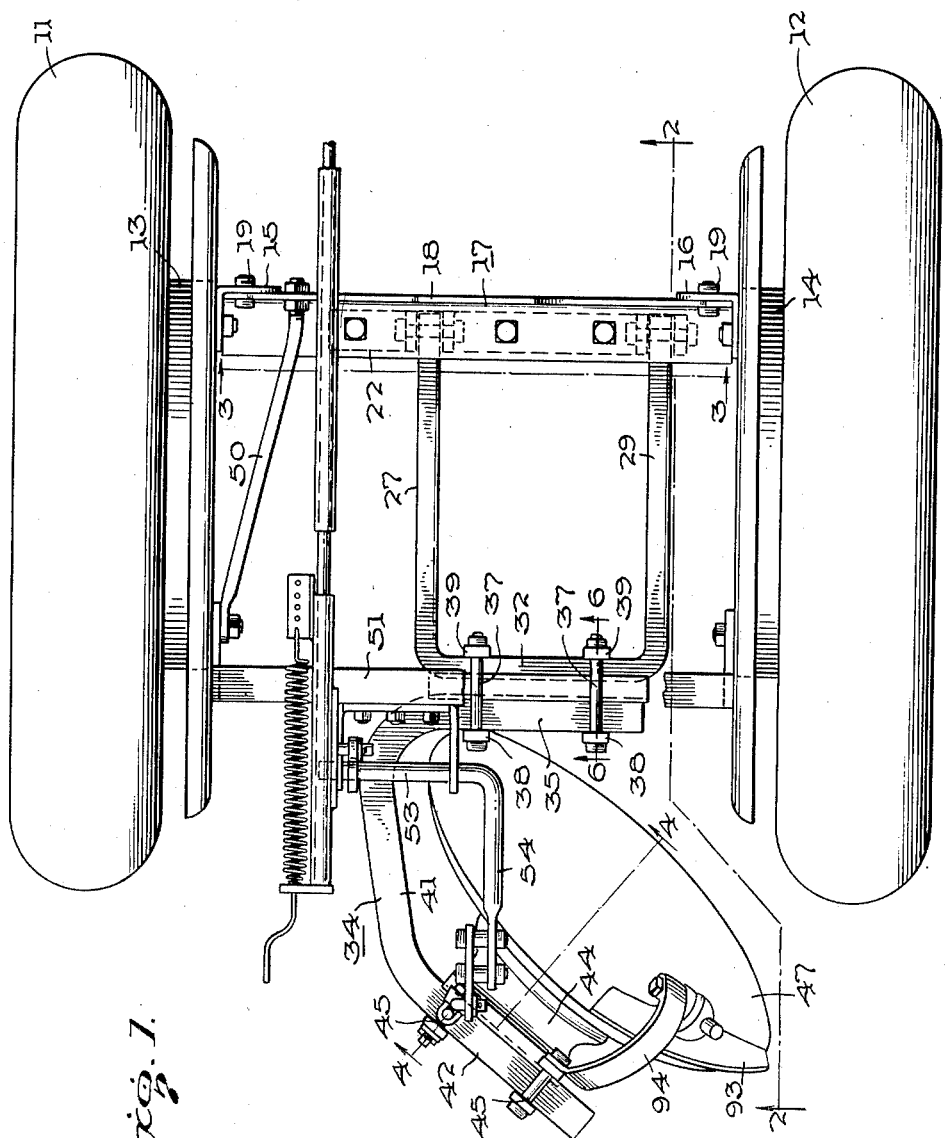
Figure 1 is a top plan view of the rear portion of a tractor to which is attached disk plow apparatus embodying the invention in its preferred form.

In accordance with the invention in its preferred form, a pulling crossbar is mounted transversely between the rear wheels of the tractor and forward of their axles. By a drawbar hitch below this crossbar, a U-shaped drawbar has its free ends pivoted to swing about a horizontal transverse axis with its legs extending rearwardly and joined by a crosspiece. One end of a beam is secured to this crosspiece, with a central portion of the beam extending rearwardly and the other end disposed at an oblique angle opposite the crosspiece. On the beam a bearing bracket carries a plow disk rotatable about an axis normal to the beam and disposed at an angle upwardly and forwardly from the beam. To raise and lower the plow a lever is fulcrumed on a lever bracket secured to the tractor frame and has one arm connected by a rigid link to the beam. Operation of the lever is effected by an extensible rod having a spring limiting extension of the rod to yieldingly urge the plow disk into the ground and a stop limiting contraction of the rod to lift the plow disk above the ground. This rod may be connected to a power lift or operated manually.

Referring now to the drawings for a more detailed description of the invention, there is shown in Fig. 1 the rear portion of a tractor having rear wheels 11 and 12 rotatable on axles within housings 13 and 14. Attached to the housings 13 and 14 by angle brackets 15 and 16, bolted on the housing, is a pulling crossbar 17 having an upwardly extending flange 18 secured by bolts 19, 19, in holes in the brackets 15 and 16. For a purpose subsequently to be described, the pulling crossbar 17 may be adjusted vertically on the brackets by inserting the bolts in upper or lower holes provided in the brackets. As shown in the drawings, the pulling crossbar 17 is secured in its uppermost position. To lower the bar, it may be secured in lower holes 21, 21. Pulling crossbar 17 which extends transversely between the rear wheels and forwardly of their axles, has a horizontal flange 22 to the underside of which is secured, as by bolts 23, 23, a drawbar hitch 24 from which depend two pairs of ears 25, 25, and 26, 26. Pivotally secured by bolt 30 between ears 25, 25, is the free end of a leg 27 of a U-shaped drawbar, designated generally at 28, and having a second leg 29, the free end of which is pivoted by bolt 31 between the ears 26, 26. A crosspiece 32 joins the ends of legs 27 and 29 opposite to their free ends which are pivoted on bolts 30 and 31. Thus, the drawbar 28 has its crosspiece 32 extending transversely and positioned rearwardly of the axles of the wheels, the drawbar being swingable about the horizontal transverse axes of pivot bolts 30 and 31.

Attached to crosspiece 32 is a beam 34, of I-beam cross-section, having one end portion 35 disposed transversely of the tractor and parallel to the crosspiece 32. Between this end portion 35 and crosspiece 32 there is arranged a spacer plate 36. As most clearly illustrated in Fig. 6, the crosspiece 32, spacer 36, and end portion 35 of the beam 34 are rigidly secured together by bolts 37, 37, extending through holes in plate 38 on the rearward side of end portion 35 having a corresponding plate 39 on the forward side of crosspiece 32. As illustrated in Fig. 1, two sets of these bolts and plates are transversely spaced to provide a rigid mounting of the beam on the crosspiece of the bar.

Beam 34 has its central portion 41 extending from one end of the end portion 35 rearwardly to a point where it connects with a second end portion 42 which extends inwardly and rearwardly from the central portion 41 so it is disposed at an oblique angle relative to the end portion 35 and crosspiece 32 and assumes a position opposite to and spaced rearwardly of the drawbar, just to the rear of the wheels 11 and 12 of the tractor. A bearing bracket 44 is supported by two sets of bolts 45, 45, spaced along the end portion 42 of the beam 34 and has a bearing 46 on which is rotatably mounted a plow disk 47. The bearing bracket 44 extends below the beam 34 and has its bearing 46 so arranged that plow disk 47 rotates about an axis normal to the end portion 42 of the beam 34, which axis extends upwardly and forwardly from the bearing bracket 44 and is thus disposed at an oblique angle extending upwardly and forwardly with respect to the tractor.

With this arrangement for mounting the plow disk on the tractor, the drawbar 28 is pivoted to move about a horizontal axis but is prevented from swinging or swaying laterally with respect to the tractor. As the plow disk is mounted on beam 34, which is rigidly secured to the drawbar 28, the plow disk is, likewise, swingable about the horizontal axis of pivot bolts 30 and 31, but is rigidly held against sidewise motion. In this way, the plow disk may be at least partially positioned between the rear wheels of the tractor and will operate within a few inches of the rear wheels. Beam 34 is so shaped to accommodate any size plow disk. In the particular illustration, the beam is designed to carry up to a 30 inch disk. With a 27 inch disk, the plow disk operates within about 12 inches of the rear wheel and has its forward edge several inches forward of the rearmost portion of the rear wheels. To steady the pulling crossbar and avoid undue strain on the brackets 15 and 16, a stay bolt 50 is secured to the upwardly extending flange 18 of the pulling crossbar and extends rearwardly to a point where it is secured to a frame member 50' of the tractor thereby preventing any tendency of the pulling crossbar 17 to twist about a transverse axis.

Secured to a transverse channel 51 of the tractor frame is a lever bracket 52 positioned above the drawbar 28 and beam 34. Journaled in this bracket 52 is a bell crank lever 53 having one arm 54 extending rearwardly of the bracket so its end is positioned above the bearing bracket 44. Attached to the end of the arm 54, as by bolts 55, 55, extending through spacers 56, 56, is a projection 57 provided with a hole through which extends the upper end 58 of a rigid link 59 having its lower end 61 extending through a hole in upwardly extending projection 62 attached to the beam 42. Preferably, link 59 is formed of two rods 63 and 64 secured together by shackles 65, 65, so the effective length of the link 59 may be adjusted.

It will be apparent that the plow disk 47 may be raised and lowered by moving upwardly extending arm 68 on the bell crank lever 53. Forward motion of the arm 68 will raise the disk whereas rearward motion will lower it. Depending upon the particular tractor to which the disk plow apparatus is attached, the lever arm 68 may be moved manually or man be connected to the power lift.

As illustrated in the drawings, the tractor is provided with a hydraulic cylinder 71 having a piston rod 72 connected at 73 to a crank 74 journaled at 75 in the tractor frame. Connected between crank 74 and lever arm 68 is an extensible rod 76. This rod consists of a main rod 77 having its forward end 78 pivotally connected at 79 to the crank 74. The forward portion of the rod 77 is provided with a reinforcing sleeve 81. Slidable on the rearward portion of the rod 77 is a sleeve 82 to which is attached, as by welding, a plate 83 having an inwardly projecting lug 84 pivoted on the end of lever arm 68 of the bell crank lever 53. Also welded on the sleeve 82 is a bracket 85 provided with a series of holes 86 in which may be secured one end 87 of a coil spring 88. The other end 89 of the spring 88 is secured in a lug 91 attached, as by welding, to the rearward end of the rod 77.

When the piston in power cylinder 71 is moved forwardly it draws rod 77 forwardly so lug 91 on the rear end of the rod engages the rearmost end of sleeve 82, thereby moving the sleeve forwardly and turning lever arm 68 in a clockwise direction, as seen in Fig. 2. This turns the bell crank 53 to raise plow disk 47 above the ground. When the piston in power cylinder 71 is reversed and moved rearwardly it lowers the plow disk 47 into engagement with the ground. Further rearward motion of the rod 77 causes it to slide through sleeve 82 moving lug 91 away from the rear end of the sleeve and tensioning spring 88. The tension of the spring acting through plate 85 on the sleeve 82 yieldingly urges the sleeve 82 rearwardly to force, under yielding pressure, the plow disk into the ground. According to the type of ground being plowed, the tension of the spring may be adjusted by moving its end 87 into the proper one of the holes 86, 86. This increases or decreases the force urging the plow into the ground according to the texture of the soil. In case the plow disk engages an obstruction it may lift itself up against the force of the spring and will immediately be returned to ground engaging position.

To prevent the accumulation of dirt on the cutting surface of the plow disk 47 a scraper 93 is adjustably supported in a bracket 94 extending from bearing bracket 44 over the upper edge of the plow disk.

While the depth of cut is controlled to some extent by the tension of spring 88, deep or shallow furrows may be plowed by adjusting the pulling crossbar 18 vertically on its supporting brackets 15 and 16. To move the plow from one field to another, it is unnecessary to disconnect the plow disk as the piston rod 72 may be moved forwardly in the power cylinder so rod 77 is moved forwardly until its lug 91 engages the rear end of sleeve 82, thereby moving the sleeve forwardly with the rod. This turns the bell crank lever to lift the plow above the level of the ground so the tractor may be driven from one place to another with the plow connected to it.

What is claimed is:

In combination with a tractor having spaced rear wheels and a power cylinder with a piston rod for operating accessories, disk plow apparatus comprising a pulling crossbar mounted transversely on the tractor frame between the rear wheels and forwardly of their axles, a drawbar hitch mounted on said crossbar, a U-shaped drawbar having a pair of legs joined at one end by a transversely extending cross-piece disposed rearwardly of said axles, means pivotally connecting the free ends of said legs to said hitch at transversely spaced points permitting said drawbar to swing about a horizontal axis parallel to said cross-piece, a substantially C-shaped beam having one transversely extending end portion beside and rigidly secured to said cross-piece, said beam having a central portion extending rearwardly from said cross-piece and its free end portion angularly disposed relative to said central portion and arranged rearwardly thereof between said wheels, a plow disk rotatably mounted on said free end portion of said beam between the rear wheels of the tractor, said plow disk being arranged for rotation about an axis extending upwardly and forwardly substantially normal to the free end portion of said beam, a bell crank lever pivoted on the tractor frame above said drawbar, a link connecting said lever to the free end of said beam, and means including a resiliently urged rod for yieldingly forcing said lever in a direction to move said plow disk downwardly and a positive stop for raising the plow disk upon operation of the power cylinder.

References Cited in the file of this patent

UNITED STATES PATENTS

| | | |
|---|---|---|
| 1,613,462 | Koger | Jan. 4, 1927 |
| 1,721,456 | Lee | July 16, 1929 |
| 1,809,694 | Harris | June 9, 1931 |
| 2,225,253 | Beyer | Dec. 17, 1940 |
| 2,302,842 | Cook | Nov. 24, 1942 |
| 2,339,225 | Strandlund | Jan. 11, 1944 |
| 2,430,732 | Orelind et al. | Nov. 11, 1947 |
| 2,546,461 | Lewis | Mar. 27, 1951 |
| 2,611,302 | De Bairos | Sept. 23, 1952 |